United States Patent
Ito (10) Patent No.: US 12,294,252 B2
(45) Date of Patent: May 6, 2025

(54) BUSBAR UNIT

(71) Applicant: SUMITOMO WIRING SYSTEMS, LTD., Mie (JP)

(72) Inventor: Yuji Ito, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 299 days.

(21) Appl. No.: 17/911,989

(22) PCT Filed: Jul. 28, 2020

(86) PCT No.: PCT/JP2020/028797
§ 371 (c)(1),
(2) Date: Sep. 15, 2022

(87) PCT Pub. No.: WO2021/192340
PCT Pub. Date: Sep. 30, 2021

(65) Prior Publication Data
US 2023/0135939 A1    May 4, 2023

(30) Foreign Application Priority Data
Mar. 27, 2020   (JP) .................. 2020-058860

(51) Int. Cl.
*H02K 11/25* (2016.01)
*H02K 3/50* (2006.01)

(52) U.S. Cl.
CPC ............... *H02K 11/25* (2016.01); *H02K 3/50* (2013.01); *H02K 2203/09* (2013.01)

(58) Field of Classification Search
CPC ....... H02K 11/25; H02K 3/50; H02K 2203/09
(Continued)

(56) References Cited

U.S. PATENT DOCUMENTS

2016/0329764 A1* 11/2016 Mizutani .................. H02K 3/12
2018/0342775 A1* 11/2018 Sei ...................... H01M 50/507

FOREIGN PATENT DOCUMENTS

JP    2016-123155 A    7/2016
JP    2018-061389 A    4/2018
(Continued)

OTHER PUBLICATIONS

JP-2019110676-A—Machine Translation (Year: 2019).*
International Search Report issued on Sep. 24, 2020 for WO 2021/192340 A1 (4 pages).

*Primary Examiner* — Tran N Nguyen
*Assistant Examiner* — Masoud Vaziri
(74) *Attorney, Agent, or Firm* — Venjuris, P.C.

(57) ABSTRACT

A busbar unit is provided with a busbar, a temperature sensor and a covering member made of insulating resin for covering the busbar and the temperature sensor. The temperature sensor includes a thermistor element and a case for accommodating the thermistor element. The busbar includes a sensor holding portion for holding the temperature sensor. The sensor holding portion includes a first supporting portion having a first contact surface, a second supporting portion having a second contact surface facing the first contact surface and a coupling portion coupling one end parts of the first supporting portion and the second supporting portion. The sensor holding portion holds the temperature sensor by sandwiching the case by the first contact surface and the second contact surface. The covering member covers outsides of the sensor holding portion and the case.

5 Claims, 3 Drawing Sheets (58) Field of Classification Search
USPC .......................................................... 310/71
See application file for complete search history.

(56) References Cited

FOREIGN PATENT DOCUMENTS

| JP | 2018-186643 A | | 11/2018 |
|---|---|---|---|
| JP | 2019110676 A | * | 7/2019 |

* cited by examiner

BUSBAR UNIT

CROSS REFERENCE TO RELATED APPLICATIONS

This application is a national phase of PCT application No. PCT/JP2020/028797, filed on 28 Jul. 2020, which claims priority from Japanese patent application No. 2020-058860, filed on 27 Mar. 2020, all of which are incorporated herein by reference.

TECHNICAL FIELD

The present disclosure relates to a busbar unit.

BACKGROUND

Some of rotating electric machines are provided with a stator including a stator coil and a busbar unit including a busbar to be electrically connected to the stator coil to supply power to the stator coil. In such a rotating electric machine, the stator coil generates heat by energization to the stator coil. If a temperature of the stator coil rises, there is a possibility of failure in each component of the rotating electric machine. Thus, the busbar unit may include a temperature sensor for detecting a temperature of the busbar electrically connected to the stator coil to monitor the temperature of the stator coil.

In a busbar unit described in Patent Document 1, one busbar has a U-shaped portion bent into a U shape. A temperature sensor includes a body portion accommodating a thermistor element and arranged between a pair of legs of the U-shaped portion, and an arm portion extending from the body portion to embrace the respective legs of the U-shaped portion. The temperature sensor is attachable to and detachable from the U-shaped portion by resiliently deforming the arm portion.

PRIOR ART DOCUMENT

Patent Document

Patent Document 1: JP 2018-061389 A

SUMMARY OF THE INVENTION

Problems to be Solved

However, if the temperature sensor is attachable to and detachable from the busbar as described in Patent Document 1, it is difficult to hold the body portion accommodating the thermistor element for detecting the temperature of the busbar in close contact with the busbar. Thus, it might become difficult to accurately detect the temperature of the busbar by the temperature sensor.

The present disclosure aims to provide a busbar unit capable of improving accuracy in detecting a temperature of a busbar by a temperature sensor.

Means to Solve the Problem

The present disclosure is directed to a busbar unit to be electrically connected to a stator coil of a stator, the busbar unit including a busbar, a temperature sensor for detecting a temperature of the busbar, and a covering member made of insulating resin for covering the busbar and the temperature sensor, wherein the temperature sensor includes a thermistor element and a case for accommodating the thermistor element, the busbar includes a sensor holding portion for holding the temperature sensor, the sensor holding portion includes a first supporting portion having a first contact surface configured to contact the case, a second supporting portion having a second contact surface facing the first contact surface and configured to contact the case and a coupling portion coupling one end parts of the first and second supporting portions and holds the temperature sensor by sandwiching the case by the first and second contact surfaces, and the covering member covers outsides of the sensor holding portion and the case.

Effect of the Invention

According to the busbar unit of the present disclosure, it is possible to improve accuracy in detecting the temperature of the busbar by the temperature sensor.

DETAILED DESCRIPTION TO EXECUTE THE INVENTION

Description of Embodiments of Present Disclosure

First, embodiments of the present disclosure are listed and described.

(1) The busbar unit of the present disclosure is to be electrically connected to a stator coil of a stator and is provided with a busbar, a temperature sensor for detecting a temperature of the busbar, and a covering member made of insulating resin for covering the busbar and the temperature sensor, wherein the temperature sensor includes a thermistor element and a case for accommodating the thermistor element, the busbar includes a sensor holding portion for holding the temperature sensor, the sensor holding portion includes a first supporting portion having a first contact surface configured to contact the case, a second supporting portion having a second contact surface facing the first contact surface and configured to contact the case and a coupling portion coupling one end parts of the first and second supporting portions and holds the temperature sensor by sandwiching the case by the first and second contact surfaces, and the covering member covers outsides of the sensor holding portion and the case.

According to the above aspect, the sensor holding portion sandwiches the case by the first and second contact surfaces. Thus, the first and second contact surface in contact with the case are easily held in close contact with the case on both sides in a sandwiching direction of sandwiching the case by the first and second contact surfaces. Therefore, the temperature of the busbar is easily transferred to the thermistor element via the case. As a result, accuracy in detecting the temperature of the busbar by the temperature sensor can be improved.

(2) Preferably, the case has an abutting surface configured to abut on the sensor holding portion, and the abutting surface is facing the sensor holding portion in a direction orthogonal to the sandwiching direction of sandwiching the case by the first and second contact surfaces.

According to the above aspect, the temperature sensor is positioned in the direction orthogonal to the sandwiching direction with respect to the sensor holding portion by the abutment of the abutting surface on the sensor holding portion.

(3) Preferably, at least a part of the case and the sensor holding portion are respectively integrated with the covering member while being covered by the covering member, the covering member includes a first exposing hole for exposing a part of a surface of the first supporting portion on a side opposite to the first contact surface to outside and a second exposing hole for exposing a part of a surface of the second supporting portion on a side opposite to the second contact surface to outside, and the first and second exposing holes extend in the sandwiching direction of sandwiching the case by the first and second contact surfaces.

According to the above aspect, a pin for forming the first exposing hole and a pin for forming the second exposing hole are provided in a mold for forming the covering member. The pin for forming the first exposing hole extends along the sandwiching direction and abuts on the surface of the first supporting portion on the side opposite to the first contact surface inside the mold. The pin for forming the second exposing hole extends along the sandwiching direction and abuts on the surface of the second supporting portion on the side opposite to the second contact surface inside the mold. Accordingly, the covering member is formed in a state where the sensor holding portion is sandwiched from the both sides in the sandwiching direction by these pins. Thus, the separation of the first and second supporting portions can be suppressed by these pins when a molten resin material for forming the covering member is filled into the mold. Therefore, it can be suppressed that close contact between the case and the sensor holding portion is reduced when the covering member is formed.

(4) Preferably, the case includes a retaining protrusion projecting outwardly of the case from an outer surface of the case, and the retaining protrusion is integrated with the covering member while being covered by the covering member.

According to the above aspect, since the retaining protrusion is fit in the covering member, a relative movement of the retaining protrusion with respect to the covering member is suppressed. Therefore, the detachment of the temperature sensor from the busbar can be suppressed not only by sandwiching the case by the sensor holding portion, but also by physically fitting the retaining protrusion and the covering member.

(5) Preferably, the case has an abutting surface configured to abut on the sensor holding portion on one end part and the retaining protrusion on the other end part, out of both end parts in the sandwiching direction of the case, the abutting surface is facing the sensor holding portion in a direction orthogonal to the sandwiching direction, the retaining protrusion has a facing surface facing the sensor holding portion, a facing direction of the facing surface and the sensor holding portion is the same as a facing direction of the abutting surface and the sensor holding portion, and positions of the abutting surface and the facing surface are shifted in the facing direction.

According to the above aspect, since the positions of the abutting surface and the facing surface are shifted in the facing direction, it can be suppressed that the temperature sensor is attached to the sensor holding portion in an improper posture inverted from a proper attachment posture with respect to the sensor holding portion when the case is attached to the sensor holding portion.

Details of Embodiments of Present Disclosure

A specific example of a busbar unit of the present disclosure is described below with reference to the drawings. Note that the present invention is not limited to these illustrations and is intended to be represented by claims and include all changes in the scope of claims and in the meaning and scope of equivalents.

One embodiment of the busbar unit is described below. Note that constituent elements may be enlargedly shown to facilitate understanding in the accompanying drawings. Further, dimensional ratios of the constituent elements may be different from actual ones or those in other figures.

Figure 1:
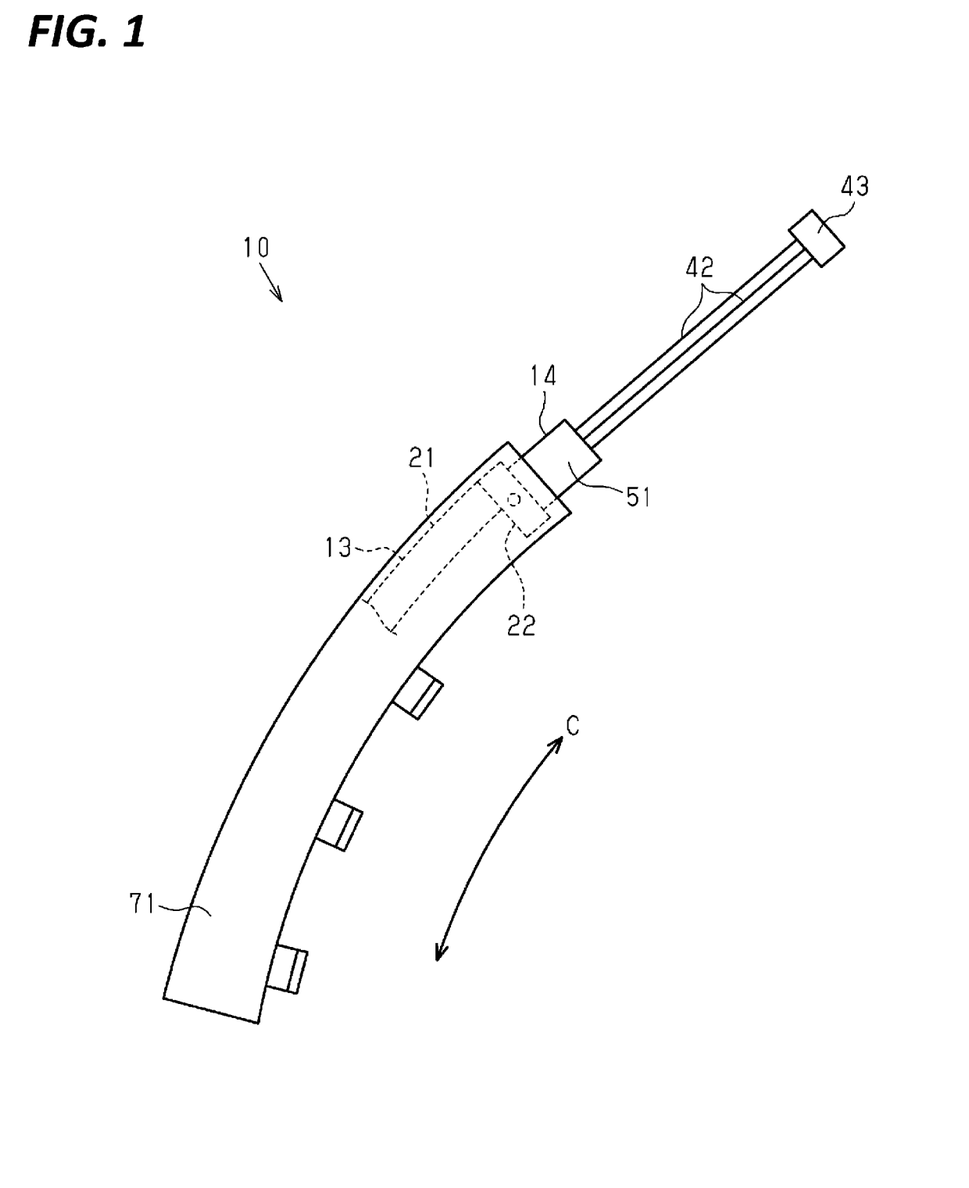
FIG. 1 is a schematic diagram of a busbar unit in one embodiment.

A busbar unit 10 of this embodiment shown in FIG. 1 is provided in a rotating electric machine used, for example, in a motor generator or the like of a hybrid or electric vehicle. The rotating electric machine includes an unillustrated annular stator core. An unillustrated stator coil is wound on this stator core. The busbar unit 10 is arranged on one end part in an axial direction of the stator core.

(Configuration of Busbar Unit 10)

The busbar unit 10 includes a busbar 13 to be electrically connected to the stator coil and a temperature sensor 14 for detecting a temperature of the busbar 13.

(Configuration of Busbar 13)

In this embodiment, the busbar 13 serves as a neutral point of the stator coil. The end part of the stator coil is electrically connected to the busbar 13 by welding or the like. In this way, the busbar unit 10 is electrically connected to the stator coil.

The busbar 13 is formed of an electrically conductive metal plate material. Copper or copper alloy excellent in electrical conductivity can be, for example, used as a material of the busbar 13.

The busbar 13 has a substantially arcuate shape as a whole. The busbar 13 includes a strip-like busbar body 21 and a sensor holding portion 22 integrally provided on one end in a longitudinal direction of the busbar body 21. That is, the busbar 13 includes the sensor holding portion 22 on one end part in the longitudinal direction.

The busbar body 21 is in the form of a strip arcuately extending when viewed from a plate thickness direction of the busbar body 21. Note that the busbar body 21 may not have a fixed width in a transverse direction or may have a stepped shape. Incidentally, the longitudinal direction of the busbar body 21 is shown as a direction of an arrow C, the transverse direction of the busbar body 21 is shown as a direction of an arrow R and the plate thickness direction of the busbar body 21 is shown as a direction of an arrow A.

Figure 2:
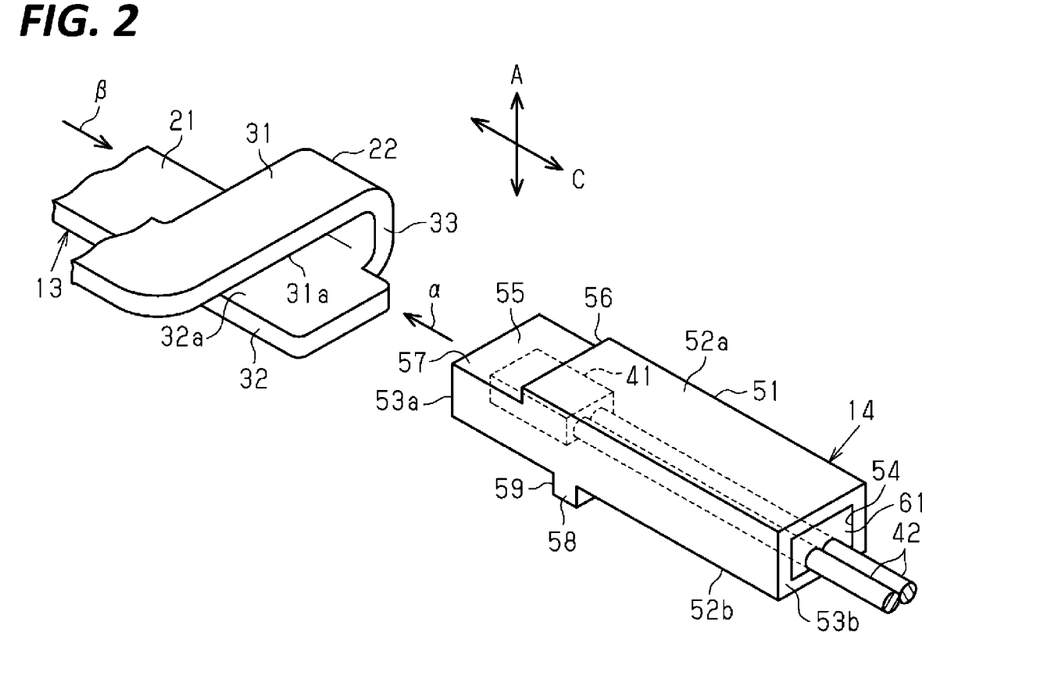
FIG. 2 is an exploded perspective view of a busbar and a temperature sensor in the one embodiment.
Figure 3:
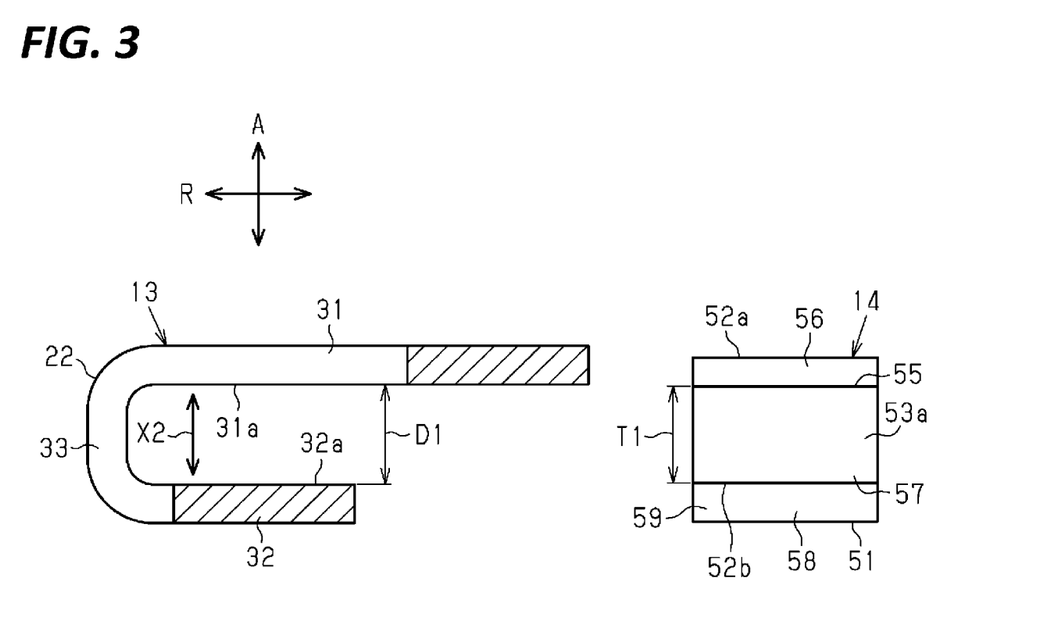
FIG. 3 is a side view of a sensor holding portion and the temperature sensor in the one embodiment.

As shown in FIGS. 2 and 3, the sensor holding portion 22 is formed by bending a part of the busbar 13 into a U shape. The sensor holding portion 22 includes a pair of first and second supporting portions 31, 32 and a coupling portion 33 coupling one end parts of the first and second supporting portions 31, 32.

The first and second supporting portions 31, 32 are in the form of rectangular flat plates. The second supporting portion 32 extends in the longitudinal direction from one end in the longitudinal direction of the busbar body 21. A plate thickness direction of the second supporting portion 32 is along that of the busbar body 21. The first supporting portion 31 is separated from the second supporting portion 32 in the plate thickness direction of the second supporting portion 32. Further, the first supporting portion 31 is facing the second supporting portion 32 in the plate thickness direction of the second supporting portion 32. A plate thickness direction of the first supporting portion 31 is along that of the second supporting portion 32. Further, the first supporting portion 31 extends along the transverse direction of the busbar body 21 when viewed from the plate thickness direction of the busbar body 21.

The coupling portion 33 is in the form of a plate extending along the plate thickness direction of the busbar body 21, i.e. the plate thickness direction of the second supporting portion 32. Further, a plate thickness direction of the coupling portion 33 is along the transverse direction of the busbar body 21. The coupling portion 33 couples the one end part of the first supporting portion 31 in the transverse direction of the busbar body 21 and the one end part of the second supporting portion 32 in the transverse direction of the busbar body 21. Thus, the sensor holding portion 22 of this embodiment has a U shape open on one side in the transverse direction of the busbar body 21 when viewed from the longitudinal direction of the busbar body 21.

The first supporting portion 31 has a first contact surface 31a. The first contact surface 31a is a side surface of the first supporting portion 31 facing the second supporting portion 32. Further, the second supporting portion 32 has a second contact surface 32a. The second contact surface 32a is a side surface of the second supporting portion 32 facing the first supporting portion 31 and a surface facing the first contact surface 31a in the plate thickness direction of the second supporting portion 32.

The sensor holding portion 22 is resiliently deformable to change an interval between the first and second supporting portions 31, 32 in the plate thickness direction of the second supporting portion 32, i.e. to change a distance between the first and second contact surfaces 31a, 32a in the plate thickness direction of the second supporting portion 32.

(Configuration of Temperature Sensor 14)

Figure 4:
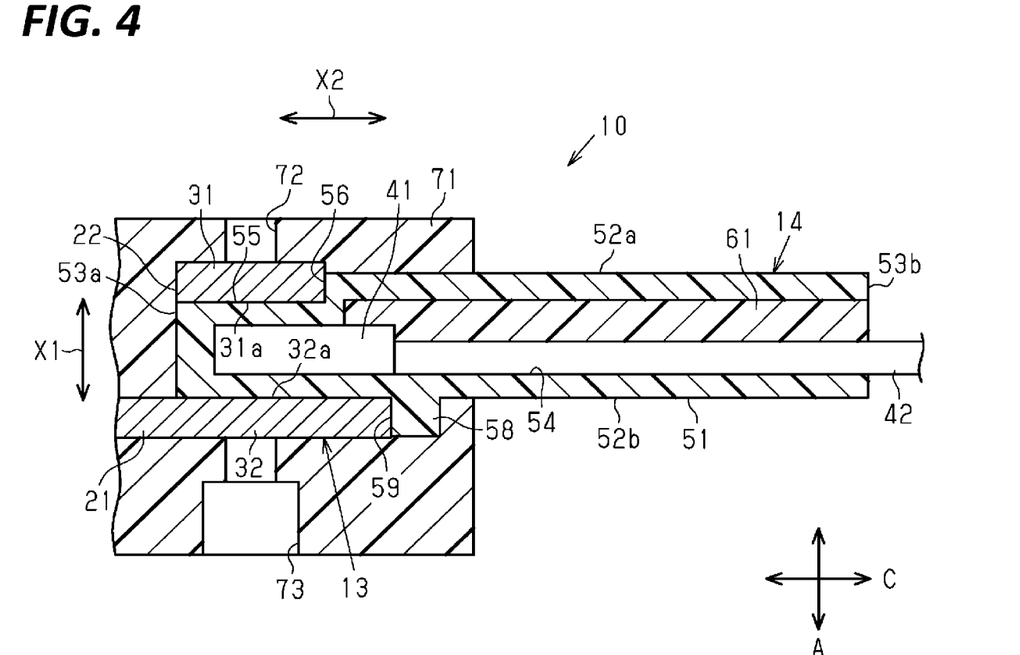
FIG. 4 is a section showing a part of the busbar unit in the one embodiment.

As shown in FIGS. 2 and 4, the temperature sensor 14 includes a thermistor element 41 and a case 51 for accommodating the thermistor element 41. One end parts of a pair of wires 42 are electrically connected to the thermistor element 41, and a connector portion 43 is provided on the other end parts of the wires 42. The connector portion 43 is shown only in FIG. 1.

The case 51 is made of an insulating resin material, e.g. polyphenylene sulfide resin (PPS). The resin material of the case 51 may contain additives such as a filler. The case 51 has a rectangular parallelepiped shape. Here, one outer side surface constituting an outer peripheral surface extending in a longitudinal direction of the case 51 is a first outer side surface 52a. In FIGS. 2 and 4, the first outer side surface 52a corresponds to the upper surface of the case 51. Further, out of outer side surfaces constituting the outer peripheral surface extending in the longitudinal direction of the case 51, an outer side surface located on the back of the first outer side surface 52a is a second outer side surface 52b. Note that the second outer side surface 52b corresponds to the lower surface of the case 51. In this embodiment, the second outer side surface 52b is parallel to the first outer side surface 52a. Further, one end in the longitudinal direction of the case 51 is a first end 53a and the other end in the longitudinal direction of the case 51 is a second end 53b.

The case 51 includes an element accommodating portion 54 recessed along the longitudinal direction of the case 51 from the second end 53b toward the first end 53a. The thermistor element 41 is arranged in the element accommodating portion 54. The pair of wires 42 are pulled out to the outside of the case 51 from an opening of the element accommodating portion 54. The thermistor element 41 is sealed inside the case 51 by a sealing resin 61 filled into the element accommodating portion 54. The sealing resin 61 is made of an insulating resin material, which may contain additives such as a filler.

A step portion 55 is provided on an end part of the first outer side surface 52a on the side of the first end 53a. That is, the step portion 55 is provided on an end part of the first outer side surface 52a on a bottom side of the element accommodating portion 54. The step portion 55 is formed to thin the case 51 in a direction perpendicular to the first outer side surface 52a. By including this step portion 55, the case 51 has an abutting surface 56 in the form of a flat surface perpendicular to the first outer side surface 52a. Note that a part of the case 51 formed with the step portion 55 and closer to the first end 53a than the abutting surface 56 serves as an inserting portion 57 to be inserted into the sensor holding portion 22.

As shown in FIG. 3, a thickness T1 of the inserting portion 57 in the direction perpendicular to the first outer side surface 52a is larger than the distance between the first and second supporting portions 31, 32, i.e. a distance D1 between the first and second contact surfaces 31a, 32a, in a state before the temperature sensor 14 is attached to the sensor holding portion 22. Note that the sensor holding portion 22 and the temperature sensor 14 shown in FIG. 3 are shown in a side view when the sensor holding portion 22 and the temperature sensor 14 are viewed from a direction of an arrow β in FIG. 2.

As shown in FIGS. 2 and 4, the case 51 includes a retaining protrusion 58 projecting outwardly of the case 51 from the second outer side surface 52b. The retaining protrusion 58 is in the form of a ridge extending along the transverse direction of the case 51 on the second outer side surface 52b when viewed from a direction perpendicular to the second outer side surface 52b. Further, the retaining protrusion 58 has a rectangular shape projecting from the second outer side surface 52b in a cross-section perpendicular to the second outer side surface 52b and parallel to the longitudinal direction of the case 51.

Out of both side surfaces of the retaining protrusion 58 in the longitudinal direction of the case 51, the side surface on the side of the first end 53a is a facing surface 59. The facing surface 59 is facing in the same direction as the abutting surface 56. The facing surface 59 is provided in parallel to the abutting surface 56 and perpendicular to the second outer side surface 52b. The positions of the abutting surface 56 and the facing surface 59 are shifted in the longitudinal direction of the case 51. In this embodiment, the facing surface 59 is located closer to the second end 53b than the abutting surface 56 in the longitudinal direction of the case 51.

Figure 5:
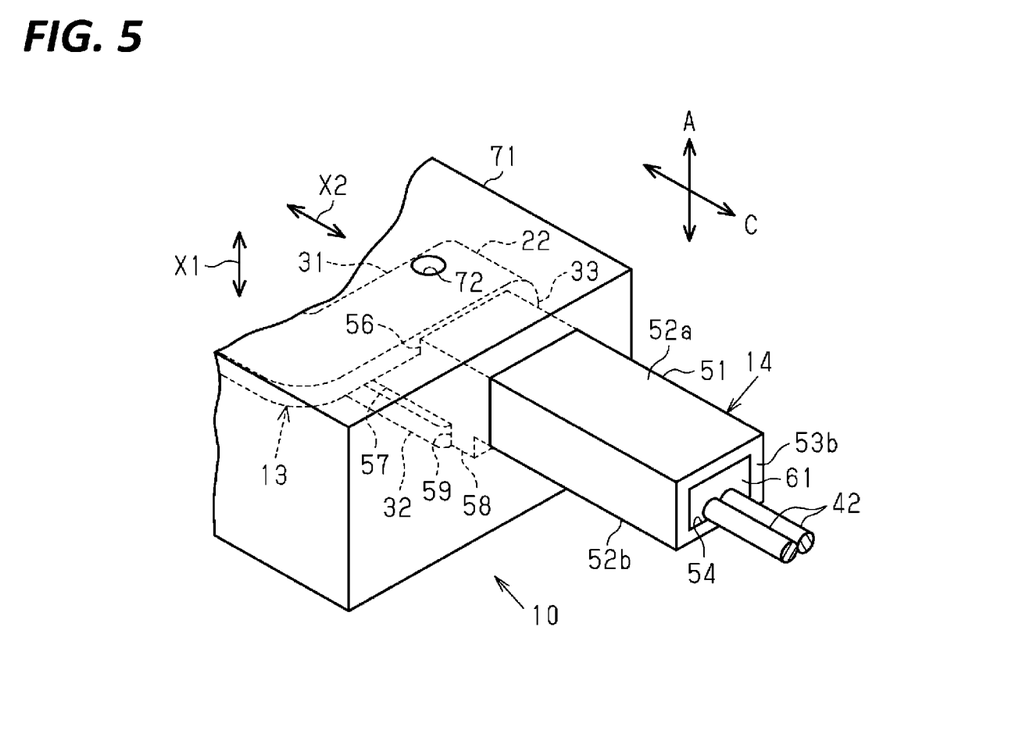
FIG. 5 is a perspective view showing a part of the busbar unit in the one embodiment.

As shown in FIGS. 2, 4 and 5, the temperature sensor 14 is held in the sensor holding portion 22. The temperature sensor 14 is attached to the busbar 13 by inserting the inserting portion 57 into between the first and second supporting portions 31, 32 along an extending direction of the busbar body 21, i.e. the longitudinal direction of the busbar body 21. Further, the inserting portion 57 of the temperature sensor 14 is inserted into between the first and second supporting portions 31, 32 by relatively moving the case 51 with respect to the sensor holding portion 22 along the longitudinal direction of the case 51. An inserting direction of the temperature sensor 14 into the sensor holding portion 22, i.e. an inserting direction of the case 51, is shown by an arrow α in FIG. 2. At this time, since the thickness T1 of the inserting portion 57 is larger than the distance D1 between the first and second contact surfaces 31a, 32a in the sensor holding portion 22 before the case 51 is inserted, the inserting portion 57 is press-fit between the first and second supporting portions 31, 32. Accordingly, the first contact surface 31a is pressed into contact with the surface of the inserting portion 57 and the second contact surface 32a is pressed into contact with the surface of the inserting portion 57. Then, the inserting portion 57, i.e. the case 51, is sandwiched by the first and second supporting portions 31, 32. That is, the sensor holding portion 22 holds the temperature sensor 14 by sandwiching the case 51 by the first and second contact surfaces 31a, 32a. Note that the temperature sensor 14 is inserted into the sensor holding portion 22 along the longitudinal direction of the busbar body 21 until the abutting surface 56 abuts on the first supporting portion 31. By the abutment of the abutting surface 56 on the first supporting portion 31, the case 51 is positioned in the inserting direction with respect to the sensor holding portion 22.

As shown in FIGS. 4 and 5, with the temperature sensor 14 held in the sensor holding portion 22, the abutting surface 56 is facing and abutting on the sensor holding portion 22 in a direction orthogonal to a sandwiching direction X1 of sandwiching the case 51 by the first and second contact surfaces 31a, 32a. In this embodiment, the direction orthogonal to the sandwiching direction X1 is the same as the inserting direction of the case 51 into the sensor holding portion 22 and is the longitudinal direction of the busbar body 21. That is, the abutting surface 56 is facing and abutting on the first supporting portion 31 in the longitudinal direction of the busbar body 21.

Further, in this state, the retaining protrusion 58 is provided on an end part of the case 51 on a side opposite to an end part where the abutting surface 56 is provided, out of both end parts in the sandwiching direction X1 of the case 51. That is, the case 51 has the abutting surface 56 on one end part and the retaining protrusion 58 on the other end part, out of the both end parts in the sandwiching direction X1 of the case 51. The facing surface 59 of the retaining protrusion 58 is facing the sensor holding portion 22. A facing direction of the facing surface 59 and the sensor holding portion 22 is the same as a facing direction X2 of the abutting surface 56 and the sensor holding portion 22. Further, since the facing direction X2 coincides with the longitudinal direction of the case 51 in this embodiment, the positions of the abutting surface 56 and the facing surface 59 are shifted in the facing direction X2. Since the facing direction X2 is the longitudinal direction of the busbar body 21 in this embodiment, the facing surface 59 is facing the second supporting portion 32 in the longitudinal direction of the busbar body 21. Further, in this embodiment, the facing surface 59 abuts on the second supporting portion 32 from the longitudinal direction of the busbar body 21.

As shown in FIG. 1, in this embodiment, the longitudinal direction of the case 51 is along the longitudinal direction of the busbar body 21 and perpendicular to the transverse direction of the busbar body 21 when viewed from the plate thickness direction of the busbar body 21. Note that the longitudinal direction of the case 51 may not necessarily be perpendicular to the transverse direction of the busbar body 21 and can be an arbitrary direction when viewed from the plate thickness direction of the busbar body 21.

(Configuration of Covering Member 71)

As shown in FIGS. 4 and 5, the busbar unit 10 includes a covering member 71 made of insulating resin for covering the outsides of the sensor holding portion 22 and the case 51. Insulating resins widely include resins excluding electrically conductive resins and are, for example, polyamide-based resins. The insulating resin may contain additives. In this embodiment, a polyamide-based resin containing a filler and the like as additives is used as the resin material for forming the covering member 71.

A part of the case 51 and the sensor holding portion 22 are respectively integrated with the covering member 71 while being covered by the covering member 71. In particular, the entire sensor holding portion 22 is embedded inside the covering member 71 and arranged inside the covering member 71. The covering member 71 covers the outer surface of the sensor holding portion 22 by being held in close contact with this outer surface. Further, a part of the case 51 from the first end 53a to a predetermined position between the retaining protrusion 58 and the second end 53b is embedded inside the covering member 71 and arranged inside the covering member 71. That is, the covering member 71 covers a range of the case 51 from the first end 53a to the predetermined position between the retaining protrusion 58 and the second end 53b from outside. The covering member 71 covers the outer surface of this range of the case 51 by being held in close contact with this outer surface. Thus, the covering member 71 covers the outer surface of the retaining protrusion 58 by being held in close contact with the outer surface. The retaining protrusion 58 is integrated with the covering member 71 while the outer surface of the retaining protrusion 58 is covered by the covering member 71. Note that the second end 53b is exposed from the covering member 71. The busbar 13, the temperature sensor 14 and the covering member 71 are integrally formed by insert molding.

The covering member 71 includes a first exposing hole 72 and a second exposing hole 73 on both sides of the sensor holding portion 22 in the sandwiching direction X1. The first exposing hole 72 exposes a part of a surface of the first supporting portion 31 on a side opposite to the first contact surface 31a to outside. The second exposing hole 73 exposes a part of a surface of the second supporting portion 32 on a side opposite to the second contact surface 32a to outside. The first and second exposing holes 72, 73 extend along the sandwiching direction X1.

The first and second exposing holes 72, 73 are holes simultaneously formed in forming the covering member 71 by insert molding. In forming the covering member 71, the sensor holding portion 22 sandwiching the case 51 is arranged inside an unillustrated mold for forming the covering member 71. An unillustrated first pin extending along the sandwiching direction X1 and configured to abut on the surface of the first supporting portion 31 on the side opposite to the first contact surface 31a is provided on the inner surface of this mold. Further, an unillustrated second pin extending along the sandwiching direction X1 and configured to abut on the surface of the second supporting portion 32 on the side opposite to the second contact surface 32a is provided on the inner surface of this mold. The molten resin material for forming the covering member 71 is filled into the mold with the sensor holding portion 22 sandwiched from both sides in the sandwiching direction X1 by the first and second pins. Then, the covering member 71 is formed by solidifying the resin material. In taking out the covering member 71 from the mold, the first and second pins are also pulled out from the covering member 71. Therefore, the covering member 71 is formed with the first exposing hole 72 at a position where the first pin was present and the second exposing hole 73 at a position where the second pin was present.

Functions and effects of this embodiment are described.

(1) The busbar unit 10 to be electrically connected to the stator coil of the stator is provided with the busbar 13, the temperature sensor 14 for detecting the temperature of the busbar 13 and the covering member 71 made of insulating resin for covering the busbar 13 and the temperature sensor 14. The temperature sensor 14 includes the thermistor element 41 and the case 51 for accommodating the thermistor element 41. The busbar 13 includes the sensor holding portion 22 for holding the temperature sensor 14. The sensor holding portion 22 includes the first supporting portion 31 having the first contact surface 31 configured to contact the case 51, the second supporting portion 32 having the second contact surface 32a facing the first contact surface 31a and configured to contact the case 51, and the coupling portion 33 coupling the one end parts of the first and second supporting portions. The sensor holding portion 22 holds the temperature sensor 14 by sandwiching the case 51 by the first and second contact surfaces 31a, 32a. The covering member 71 covers the outsides of the sensor holding portion 22 and the case 51.

According to the above aspect, the sensor holding portion 22 sandwiches the case 51 by the first and second contact surfaces 31a, 32a. In this embodiment, the first contact surface 31a is pressed against the inserting portion 57 and the second contact surface 32a is pressed against the inserting portion 57 by press-fitting the inserting portion 57 of the case 51 between the first and second supporting portions 31, 32. Accordingly, the first and second contact surfaces 31a, 32a in contact with the case 51 are held in close contact with the case 51 on both sides in the sandwiching direction X1. Therefore, the temperature of the busbar 13 is easily transferred to the thermistor element 41 via the case 51. As a result, accuracy in detecting the temperature of the busbar 13 by the temperature sensor 14 can be improved.

Further, since the sensor holding portion 22 and the case 51 are covered by the covering member 71, the detachment of the temperature sensor 14 from the sensor holding portion 22 is suppressed by the covering member 71.

(2) The case 51 has the abutting surface 56 configured to abut on the sensor holding portion 22. The abutting surface 56 is facing the sensor holding portion 22 in the direction orthogonal to the sandwiching direction X1 of sandwiching the case 51 by the first and second contact surfaces 31a, 32a.

According to the above aspect, the temperature sensor 14 is positioned in the direction orthogonal to the sandwiching direction X1 with respect to the sensor holding portion 22 by the abutment of the abutting surface 56 on the sensor holding portion 22. In this embodiment, the abutting surface 56 abuts on the first supporting portion 31 from the longitudinal direction of the busbar body 21, whereby the temperature sensor 14 is positioned in the longitudinal direction of the busbar body 21 with respect to the sensor holding portion 22 and the case 51 is positioned in the longitudinal direction of the case 51 with respect to the sensor holding portion 22. Therefore, the temperature sensor 14 is easily attached to the sensor holding portion 22.

(3) A part of the case 51 and the sensor holding portion 22 are respectively integrated with the covering member 71 while being covered by the covering member 71. The covering member 71 includes the first exposing hole 72 for exposing a part of the surface of the first supporting portion 31 on the side opposite to the first contact surface 31a to outside and the second exposing hole 73 for exposing a part of the surface of the second supporting portion 32 on the side opposite to the second contact surface 32a to outside. The first and second exposing holes 72, 73 extend along the sandwiching direction X1 of sandwiching the case 51 by the first and second contact surfaces 31a, 32a.

According to the above aspect, the first pin for forming the first exposing hole 72 and the second pin for forming the second exposing hole 73 are provided in the mold for forming the covering member 71. The first pin extends along the sandwiching direction X1 and abuts on the surface of the first supporting portion 31 on the side opposite to the first contact surface 31a inside the mold. The second pin extends along the sandwiching direction X1 and abuts on the surface of the second supporting portion 32 on the side opposite to the second contact surface 32a inside the mold. Accordingly, the covering member 71 is formed with the sensor holding portion 22 sandwiched from the both sides in the sandwiching direction X1 by the first and second pins. Thus, when the molten resin material for forming the covering member 71 is filled into the mold, the separation of the first and second supporting portions 31, 32 can be suppressed by the first and second pins. Therefore, it can be suppressed that close contact between the case 51 and the sensor holding portion 22 is reduced when the covering member 71 is formed.

Further, since the covering member 71 is integrated by covering a part of the case 51 and the sensor holding portion 22, the temperature sensor 14 is undetachable from the busbar 13. Therefore, the temperature sensor 14 can be firmly fixed to the busbar 13 as compared to the case where a temperature sensor is detachable from a busbar.

(4) The case 51 includes the retaining protrusion 58 projecting outwardly of the case 51 from the second outer side surface 52b. The retaining protrusion 58 is integrated with the covering member 71 while being covered by the covering member 71.

According to the above aspect, since the retaining protrusion 58 is fit in the covering member 71, a relative movement of the retaining protrusion 58 with respect to the covering member 71 is suppressed. Therefore, the detachment of the temperature sensor 14 from the busbar 13 can be suppressed not only by sandwiching the case 51 by the sensor holding portion 22, but also by physically fitting the retaining protrusion 58 and the covering member 71.

(5) The case 51 has the abutting surface 56 configured to abut on the sensor holding portion 22 on the one end part and the retaining protrusion 58 on the other end part, out of the both end parts in the sandwiching direction X1 of the case 51. The abutting surface 56 is facing the sensor holding portion 22 in the direction orthogonal to the sandwiching direction X1. The retaining protrusion 58 has the facing surface 59 facing the sensor holding portion 22. The facing direction of the facing surface 59 and the sensor holding portion 22 is the same as the facing direction X2 of the abutting surface 56 and the sensor holding portion 22. The positions of the abutting surface 56 and the facing surface 59 are shifted in the facing direction X2.

According to the above aspect, since the positions of the abutting surface 56 and the facing surface 59 are shifted in the facing direction X2, it can be suppressed that the temperature sensor 14 is attached to the sensor holding portion 22 in an improper posture inverted from a proper attachment posture with respect to the sensor holding portion 22 when the case 51 is attached to the sensor holding portion 22.

This embodiment can be modified and carried out as follows. This embodiment and the following modifications can be carried out in combination without technically contradicting.

In the above embodiment, the facing surface 59 abuts on the second supporting portion 32 of the sensor holding portion 22. However, the facing surface 59 may not necessarily abut on the sensor holding portion 22. Also in this case, an effect similar to the effect (5) of the above embodiment can be obtained if the positions of the abutting surface 56 and the facing surface 59 are shifted in the facing direction X2.

In the above embodiment, the facing surface 59 is provided on the side surface of the retaining protrusion 58. However, the facing surface 59 may be formed on the case 51 by providing the second outer side surface 52b with the step portion 55. Further, the case 51 may not necessarily have the facing surface 59.

In the above embodiment, the retaining protrusion 58 is provided on the second outer side surface 52b. However, the retaining protrusion 58 may be provided on the outer side surface other than the first and second outer side surfaces 52a, 52b, out of the outer side surfaces constituting the outer peripheral surface of the case 51. Further, the case 51 may not necessarily include the retaining protrusion 58.

The covering member 71 may include only either one of the first and second exposing holes 72, 73. Further, the covering member 71 may include neither of the first and second exposing holes 72, 73.

In the above embodiment, the abutting surface 56 is formed on the case 51 by providing the step portion 55. However, the retaining protrusion 58 may be provided on the first outer side surface 52a, and a surface on the side of the first end 53a, out of both side surfaces of the retaining protrusion 58 in the longitudinal direction of the case 51 may be the abutting surface 56. Further, the case 51 may not necessarily have the abutting surface 56.

In the above embodiment, the inserting portion 57 is inserted into the sensor holding portion 22 along the longitudinal direction of the case 51 and along the longitudinal direction of the busbar body 21. However, the inserting direction of the inserting portion 57 into the sensor holding portion 22 is not limited to this. For example, the inserting portion 57 may be inserted into between the first and second supporting portions 31, 32 along the transverse direction of the case 51 and along the transverse direction of the busbar body 21 when viewed from the plate thickness direction of the busbar body 21.

In the above embodiment, the sensor holding portion 22 has the U shape open on the one side in the transverse direction of the busbar body 21 when viewed from the longitudinal direction of the busbar body 21. However, the shape of the sensor holding portion 22 is not limited to that of the above embodiment as long as the sensor holding portion 22 includes the first supporting portion 31 having the first contact surface 31a, the second supporting portion 32 having the second contact surface 32a facing the first contact surface 31a and the coupling portion 33 coupling the one end parts of the first and second supporting portions 31, 32. For example, the sensor holding portion 22 may include the coupling portion 33 having an arcuate shape when viewed from the longitudinal direction of the busbar body 21. Further, for example, the sensor holding portion 22 may have a U shape open on one side in the longitudinal direction of the busbar body 21 when viewed from the transverse direction of the busbar body 21.

The shape of the busbar body 21 is not limited to that of the above embodiment. For example, a busbar body may be in the form of a linearly extending strip.

In the above embodiment, the busbar 13 includes the sensor holding portion 22 in the one end part in the longitudinal direction of the busbar 13. However, the position of the sensor holding portion 22 in the busbar 13 is not limited to this. For example, the busbar 13 may include the sensor holding portion 22 in a central part in the longitudinal direction of the busbar 13.

In the above embodiment, copper and copper alloy are cited as examples of the material of the busbar 13. However, the material of the busbar 13 is not limited to these if the material is a metal material. For example, the busbar 13 may be made of aluminum or aluminum alloy.

The busbar 13 may not necessarily be the busbar serving as the neutral point of the stator coil. The busbar 13 only has to be a busbar provided in the busbar unit 10 to supply power to the stator coil.

In the above embodiment, the covering member 71 is formed integrally with the sensor holding portion 22 and the case 51 by insert molding. However, the covering member 71 may not necessarily be formed by insert molding as long as the covering member 71 is made of insulating resin and covers the outsides of the sensor holding portion 22 and the case 51. For example, the covering member 71 may be a cover formed separately from the sensor holding portion 22 and the case 51 and to be mounted to cover the sensor holding portion 22 and the case 51 after the case 51 is inserted into the sensor holding portion 22. Further, the covering member 71 may be, for example, made of insulating resin applied to the sensor holding portion 22 and the case 51.

The busbar unit 10 may be configured to be capable of detecting a temperature at a neutral point of a three-phase coil of a three-phase alternating current rotating electric machine. For example, the busbar 13 may be configured to be connected to a neutral line constituting the neutral point of the three-phase coil of the three-phase alternating current rotating electric machine or may be configured as the neutral point itself.

As shown in FIG. 4, the sensor holding portion 22 of the embodiment may be configured to as a pinch clip or U-shaped clip for clipping the temperature sensor 14 at a position matching or corresponding to the thermistor element 41.

As shown in FIG. 2, the busbar 13 can have a distal surface or first end surface intersecting or orthogonal to the longitudinal direction (arrow C) of the busbar 13. The first supporting portion 31 of the sensor holding portion 22 can have a side end surface intersecting or orthogonal to the longitudinal direction (arrow C) of the busbar 13. This side end surface of the first supporting portion 31 may be called a second end surface of the busbar 13. As shown in FIG. 4, the first and second end surfaces of the busbar 13 may be shifted in the longitudinal direction (arrow C) of the busbar 13 and/or the thickness direction (arrow A) of the busbar 13. The first and second end surfaces of the busbar 13 can respectively contact the abutting surface 56 and the facing surface 59 of the case 51. The first and second end surfaces of the busbar 13 and the abutting surface 56 and the facing surface 59 of the case 51 are an example of a stopper for positioning the case 51 with respect to the busbar 13.

In several implementation examples, the outer surfaces of the busbar 13 (second contact surface 32a) and the case 51 may be directly in contact outside the case 51 as shown in FIG. 4 or may form a metal-to-plastic contact surface or metal-to-plastic planar interface).

In several implementation examples, the inner surface of the case 51 and the outer surface of the thermistor element 41 may be directly in contact inside the case 51 as shown in FIG. 4 or may form a plastic-to-plastic contact surface or plastic-to-plastic planar interface).

In several implementation examples, as shown in FIG. 4, a wall thickness of the case 51 at a position where the case 51 is sandwiched by the second contact surface 32a of the busbar 13 and the thermistor element 41 may be equal to a shortest distance between the second contact surface 32a of the busbar 13 and the outer surface of the thermistor element 41.

In several implementation examples, as shown in FIG. 4, a wall thickness of the case 51 at a position where the case 51 is sandwiched by the first supporting portion 31 of the busbar 13 and the thermistor element 41 may be equal to a shortest distance between the first supporting portion 31 of the busbar 13 and the outer surface of the thermistor element 41.

In several implementation examples, the distal end of the busbar 13 and the sensor holding portion 22 in the longitudinal direction (arrow C) may be covered by the covering member 71 and may not project from the covering member 71 as shown in FIGS. 4 and 5.

In several implementation examples, as shown in FIGS. 4 and 5, the temperature sensor 14 may include a first length part embedded in the covering member 71 and a second length part projecting from the covering member 71 without being embedded in the covering member 71. For example, the entire thermistor element 41 may be included in the first length part of the temperature sensor 14. The step portion 55 and the retaining protrusion 58 of the case 51 may be included in the first length part of the temperature sensor 14 and may be embedded in the covering member 71 so as not to be exposed from the covering member 71.

The present disclosure includes the following implementation example. Reference signs of several constituent elements of the illustrative embodiment are given not for limitation, but for understanding assistance. Some of features described in the following implementation example may be omitted or several of the features described in the implementation example may be selected or extracted and combined.

[Addendum 1] A busbar unit (10) according to one or more implementation examples of the present disclosure can be configured to be capable of detecting a temperature of a neutral point of a three-phase coil of a three-phase alternating current rotating electric machine and provided with a temperature sensor (14), a busbar (13) and an insulating resin cover (71), wherein:

the temperature sensor (14) can include a thermistor element (41) and an insulating resin case (51) for accommodating the thermistor element (41), the busbar (13) may be configured to be electrically connected to a neutral line constituting the neutral point of the three-phase coil of the three-phase alternating current rotating electric machine or configured as the neutral point itself and can have a longitudinal direction (C), a mount surface (32a) configured such that the temperature sensor (14) is mounted thereon and a clip (22) for clipping the temperature sensor (14) on the mount surface (32a) at a position corresponding to the thermistor element (41), and the insulating resin cover (71) can be configured to cover a part of the busbar (13) and a part of the temperature sensor (14) and the clip (22) may be included in the part of the busbar (13) covered by the insulating resin cover (71).

LIST OF REFERENCE NUMERALS 10 busbar unit
13 busbar
14 temperature sensor
21 busbar body
22 sensor holding portion
31 first supporting portion
31a first contact surface
32 second supporting portion
32a second contact surface
33 coupling portion
41 thermistor element
42 wire
43 connector portion
51 case
52a first outer side surface
52b second outer side surface
53a first end
53b second end
54 element accommodating portion
55 step portion
56 abutting surface
57 inserting portion
58 retaining protrusion
59 facing surface
61 sealing resin
71 covering member
72 first exposing hole
73 second exposing hole
D1 distance
T1 thickness
X1 sandwiching direction
X2 facing direction

What is claimed is:

1. A busbar unit to be electrically connected to a stator coil of a stator, comprising:
a busbar;
a temperature sensor for detecting a temperature of the busbar; and
a covering member made of insulating resin for covering the busbar and the temperature sensor,
wherein:
the temperature sensor includes a thermistor element and a case for accommodating the thermistor element,
the busbar includes a sensor holding portion for holding the temperature sensor,
the sensor holding portion includes a first supporting portion having a first contact surface configured to contact the case, a second supporting portion having a second contact surface facing the first contact surface and configured to contact the case and a coupling portion coupling one end parts of the first and second supporting portions and holds the temperature sensor by sandwiching the case by the first and second contact surfaces,
the covering member covers outsides of the sensor holding portion and the case, and
the case has an abutting surface configured to abut on the sensor holding portion on one end part and a retaining protrusion on the other end part, out of both end parts in a sandwiching direction of sandwiching the case.

2. The busbar unit of claim 1, wherein:
the abutting surface is facing the sensor holding portion in a direction orthogonal to the sandwiching direction of sandwiching the case by the first and second contact surface.

3. The busbar unit of claim 1, wherein:
at least a part of the case and the sensor holding portion are respectively integrated with the covering member while being covered by the covering member,
the covering member includes a first exposing hole for exposing a part of a surface of the first supporting portion on a side opposite to the first contact surface to outside and a second exposing hole for exposing a part of a surface of the second supporting portion on a side opposite to the second contact surface to outside, and
the first and second exposing holes extend in the sandwiching direction of sandwiching the case by the first and second contact surfaces.

4. The busbar unit of claim 1, wherein:
the retaining protrusion is integrated with the covering member while being covered by the covering member.

5. The busbar unit of claim 1, wherein:
the abutting surface is facing the sensor holding portion in a direction orthogonal to the sandwiching direction,
the retaining protrusion has a facing surface facing the sensor holding portion,
a facing direction of the facing surface and the sensor holding portion is the same as a facing direction of the abutting surface and the sensor holding portion, and
positions of the abutting surface and the facing surface are shifted in the facing direction.

\* \* \* \* \*